United States Patent [19]
Bayerle et al.

[11] Patent Number: 6,085,517
[45] Date of Patent: Jul. 11, 2000

[54] PROCESS FOR CONTROLLING A FUEL-OXYGEN RATIO IN EXHAUST GAS UPSTREAM OF A CATALYTIC CONVERTER

[75] Inventors: Klaus Bayerle, Regensburg; Anton Angermaier, Thann, both of Germany

[73] Assignee: Siemens Aktiengesellschaft, Munich, Germany

[21] Appl. No.: 08/883,033

[22] Filed: Jun. 26, 1997

Related U.S. Application Data

[63] Continuation of application No. PCT/DE96/02030, Oct. 24, 1996.

[30] Foreign Application Priority Data

Oct. 26, 1995 [DE] Germany .......................... 195 39 937

[51] Int. Cl.⁷ ...................................................... F01N 3/00
[52] U.S. Cl. .............................. 60/274; 60/285; 60/276; 60/289; 60/293
[58] Field of Search ............................ 60/289, 290, 291, 60/292, 293, 274, 285, 287, 307, 276

[56] References Cited

U.S. PATENT DOCUMENTS

| | | | |
|---|---|---|---|
| 3,927,524 | 12/1975 | Cholvin ...................................... | 60/289 |
| 4,175,386 | 11/1979 | Katahira et al. .......................... | 60/276 |
| 5,136,842 | 8/1992 | Achleitner . | |
| 5,235,956 | 8/1993 | Yoshizaki . | |
| 5,285,639 | 2/1994 | Araki et al. ............................... | 60/417 |
| 5,388,402 | 2/1995 | Aoki et al. ................................. | 60/276 |
| 5,400,591 | 3/1995 | Aramaki . | |
| 5,444,978 | 8/1995 | Yoshizaki et al. ......................... | 60/276 |
| 5,493,858 | 2/1996 | Hosoya et al. ............................ | 60/289 |

FOREIGN PATENT DOCUMENTS

| | | |
|---|---|---|
| 0 659 986 A1 | 6/1995 | European Pat. Off. . |
| 2 726 031 | 4/1996 | France . |
| 41 41 946 A1 | 6/1993 | Germany . |
| 43 24 506 A1 | 1/1994 | Germany . |
| 195 05 687 A1 | 8/1996 | Germany . |

OTHER PUBLICATIONS

Patent Abstracts of Japan No. 63–179119 (Naoyuki), dated Jul. 23, 1988.

"Exhaust gas purification in Ottomotors by means of catalytic after–combustion with regulated exhause gas composition" (Grossmann et al.), ATZ Automobiltechnische Zeitschrift, vol. 75, No. 4, 1973, pp. 140–143.

*Primary Examiner*—Thomas Denion
*Assistant Examiner*—Binh Tran
*Attorney, Agent, or Firm*—Herbert L. Lerner; Laurence A. Greenberg; Werner H. Stemer

[57] ABSTRACT

During the warm-up phase of a catalytic converter, the fuel-oxygen ratio in the exhaust gas upstream of the catalytic converter is regulated in dependence on the temperature of the catalytic converter. The amount of fuel is measured on the basis of an injection time into the internal combustion engine. The injection time is calculated from a basic injection time weighted with a weighting factor. The weighting factor depends on the secondary air mass which is delivered to the exhaust gas duct and on a predetermined set value for the fuel-oxygen ratio of the exhaust gas (Δvalue) upstream of the catalytic converter. The secondary air mass is regulated in dependence on an engine air intake.

10 Claims, 2 Drawing Sheets

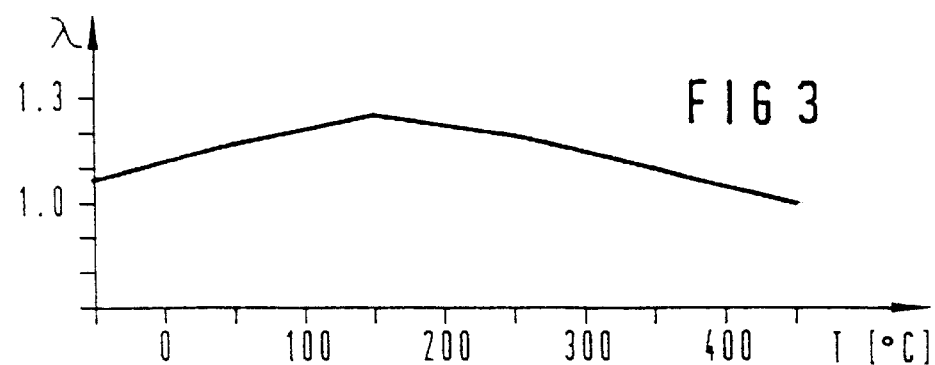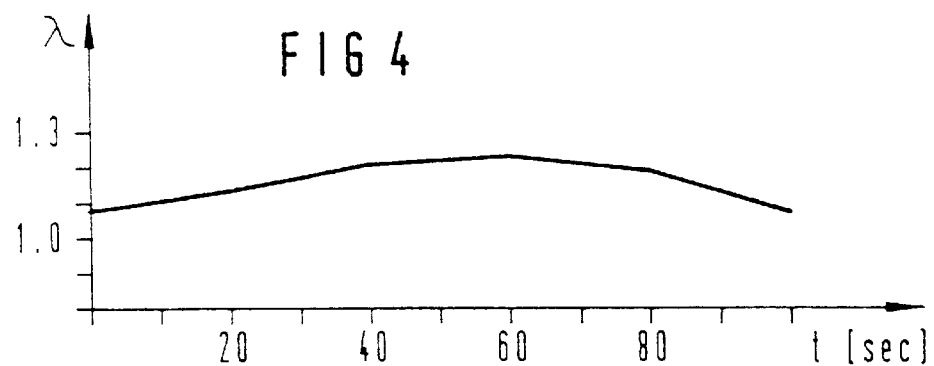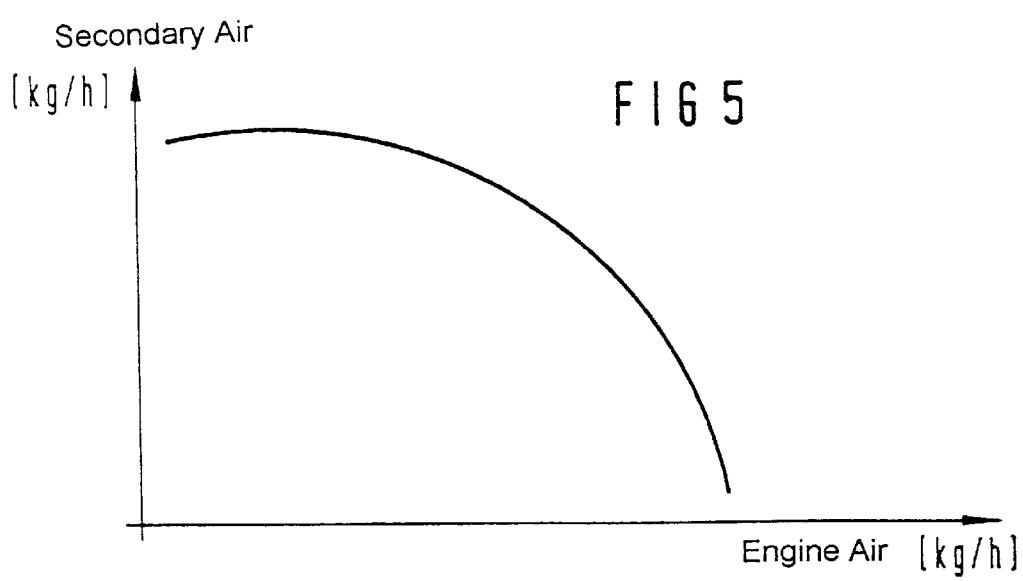

PROCESS FOR CONTROLLING A FUEL-OXYGEN RATIO IN EXHAUST GAS UPSTREAM OF A CATALYTIC CONVERTER

CROSS-REFERENCE TO RELATED APPLICATION

This application is a continuation of copending international application PCT/DE96/02030, filed Oct. 24, 1996, which designated the United States.

BACKGROUND OF THE INVENTION

1. Field of the Invention

The invention relates to a process for regulating the fuel-oxygen ratio of exhaust gas in an exhaust gas duct upstream of a catalytic converter, wherein a secondary air pump injects secondary air into the exhaust gas duct upstream of the catalytic converter.

2. Description of the Related Art

A method for regulating the fuel-oxygen ratio of exhaust gas upstream of a catalytic converter of an internal combustion engine has become known from German published, non-prosecuted patent application DE 41 41 946 A1. In that method, air is injected into the exhaust gas duct upstream of the catalytic converter with a secondary air pump. The quantity of air pumped by the secondary air pump is adapted to the quantity of exhaust gas. To that end, the secondary air pump is either pilot-controlled, taking into account the load and rpm of the engine, or regulated, given an operationally ready lambda control. The control and regulation of the secondary air mass is relatively sluggish, and so a desired exhaust gas ratio can be established only relatively imprecisely.

SUMMARY OF THE INVENTION

It is accordingly an object of the invention to provide a process for regulating the fuel-oxygen ratio of exhaust gas in an exhaust gas duct upstream of a catalytic converter, which overcomes the above-mentioned disadvantages of the prior art methods of this general type and which optimizes the heating of the catalytic converter and, in particular, shortens its heat-up time.

With the foregoing and other objects in view there is provided, in accordance with the invention, a process for open loop or closed loop control of an exhaust gas ratio of fuel to oxygen in an internal combustion engine exhaust gas upstream of a catalytic converter. The method comprises injecting secondary air into an exhaust gas duct between an internal combustion engine and a catalytic converter with a secondary air pump; and adjusting an amount of fuel supplied to the internal combustion engine in dependence on the secondary air and on a predetermined value for an exhaust gas ratio upstream of the catalytic converter.

In other words, the essence of the invention is to adjust the exhaust gas ratio upstream of the catalytic converter during the warm up phase of the catalytic converter as a function of the secondary air mass in such a way that it is within a predetermined range of values.

In accordance with an additional feature of the invention, the secondary air mass is regulated as a function of an exhaust gas pressure in the exhaust gas duct upstream of the catalytic converter, or as a function of an engine air mass delivered to the engine.

The preferred fuel to oxygen ratio in the exhaust gas, i.e. the exhaust gas ratio $\Delta$ is from 1.0 to 1.3.

In accordance with another feature of the invention, the predetermined value of the exhaust gas ratio is defined in dependence on the temperature of the catalytic converter. Alternatively, the predetermined value of the exhaust gas ratio is defined in dependence on an operating time of the internal combustion engine measured from a last start of the engine.

In accordance with a further feature of the invention, an amount of secondary air mass supplied to the exhaust gas duct is regulated with an air valve having an ON position and an OFF position and with a metering valve blowing off excess secondary air to the environment.

In accordance with again a further feature of the invention, a fuel quantity is calculated using a basic value multiplied by a weighting factor, wherein the weighting factor is dependent on the secondary air mass and on the predetermined value for the exhaust gas ratio. Preferably, a maximum weighting factor is set and the calculated weighting factor is limited to the maximum weighting factor.

With the above and other features in view there is also provided, in accordance with the invention, a process for controlling the exhaust gas ratio which comprises the steps of supplying a given amount of fuel to the internal combustion engine, determining a desired value for an exhaust gas ratio upstream of the catalytic converter; and injecting secondary air into the exhaust gas duct between the internal combustion engine and the catalytic converter with a secondary air pump, and adjusting an amount of secondary air in dependence on the given amount of fuel supplied to the internal combustion engine and on the desired value for the exhaust gas ratio.

Other features which are considered as characteristic for the invention are set forth in the appended claims.

Although the invention is illustrated and described herein as embodied in a process for regulating the fuel-oxygen ratio of exhaust gas in an exhaust gas section upstream of a catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a graph of a first characteristic curve for an exhaust gas ratio;

FIG. 4 is a graph of a second characteristic curve for the exhaust gas ratio; and FIG. 5 is a graph of a characteristic curve for a secondary air mass.

DESCRIPTION OF THE PREFERRED EMBODIMENTS

Figure 1:
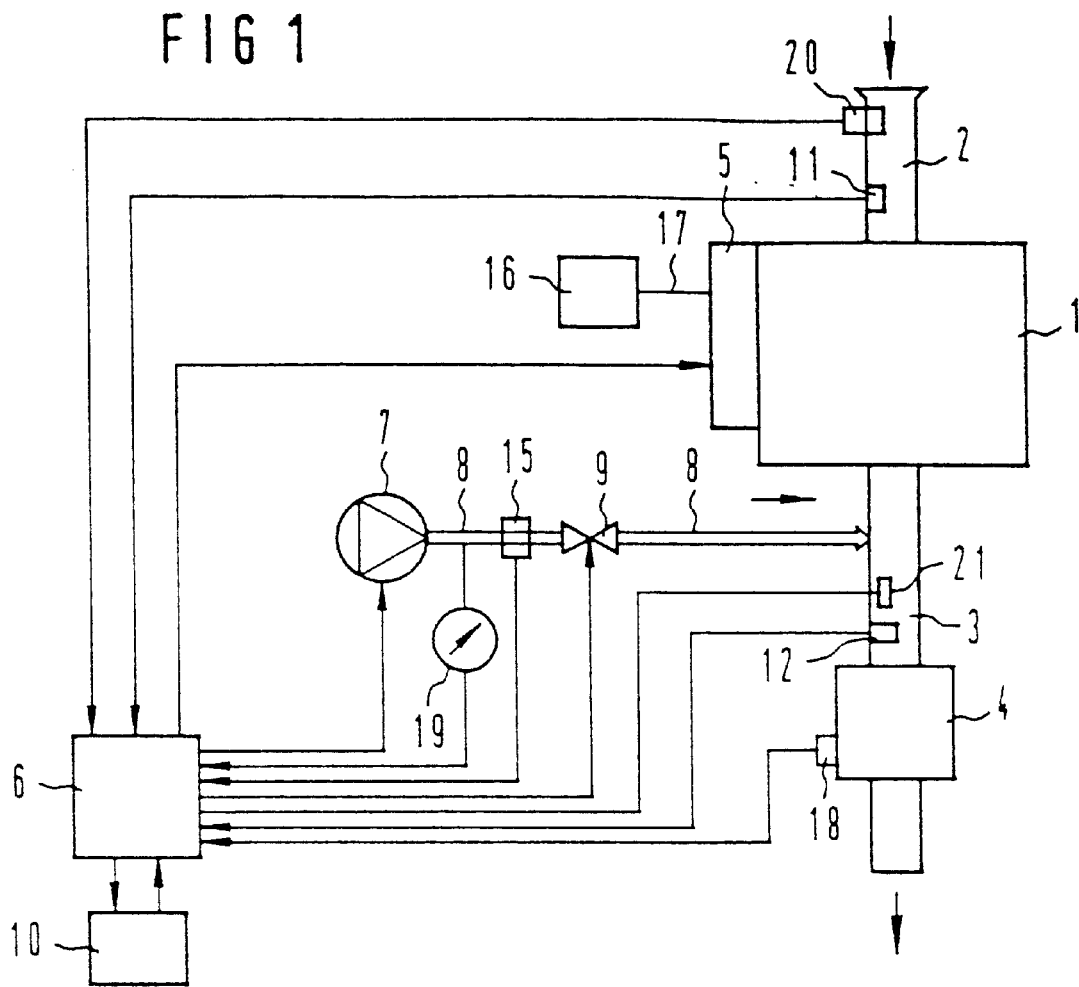
FIG. 1 is a schematic and diagrammatic view of a configuration for performing the process of the invention.

Referring now to the figures of the drawing in detail and first, particularly, to FIG. 1 thereof, there is seen an internal combustion engine 1, which has an intake pipe or duct 2 and an exhaust gas pipe or duct 3. An air mass meter 11 is disposed in the intake duct 2, and an exhaust gas probe 12 and a first pressure sensor 21 are disposed in the exhaust gas duct 3. The engine 1 communicates through the exhaust gas duct 3 with a catalytic converter 4. A secondary air pump 7 communicates with the exhaust gas duct 3 through an air duct 8 and an air valve 9. An injection system 5 is disposed in the engine 1 and is connected through a control line to a control unit 6 and through a supply line 17 to a fuel tank 16.

The control unit 6 communicates with a memory 10 through a data line and also communicates through control lines with the secondary air pump 7 and the air valve 9 and through a signal line with the air mass meter 11 and the first pressure sensor 21. The air valve 9 is an on/off valve that is controlled by the control unit 6. A temperature sensor 18, which through a signal line passes the temperature of the catalytic converter 4 to the control unit 6, is disposed on or in the catalytic converter 4.

The secondary air pump 7, in a simple embodiment, pumps a constant secondary air mass per unit of time, or in a more complicated version can be regulated in its rpm by the control unit 6, so that the secondary air mass per unit of time is freely adjustable. The adjustment of the secondary air mass is either constant or is carried out as a function of a performance graph stored in the memory 10. The performance graph specifies the secondary air mass per unit of time to be pre-controlled as a function of the engine air mass or as a function of the exhaust gas pressure in the exhaust gas duct 3 upstream of the catalytic converter 4. The exhaust gas pressure is a function of the engine air mass. The term engine air mass designates the air that is aspirated by the engine through the intake duct 2.

The air mass meter 11 measures the mass of engine air aspirated into the engine 1 per unit of time and passes a signal with this information to the control unit 6. The exhaust gas probe 12 measures the exhaust gas ratio, and in particular whether the ratio of fuel to oxygen—referred to in the following as the exhaust gas ratio—in the exhaust gas duct 3 is less than or greater than 1. The exhaust gas probe 12 sends an appropriate signal with that information to the control unit 6.

If there is a stoichiometric ratio of fuel to oxygen, the exhaust gas ratio is $\Delta=1$. Air excess after the combustion (lean) is represented by $\Delta>1$ and fuel excess after combustion (rich) is represented by $\Delta<1$.

The fuel quantity is calculated by the control unit 6 from a formula, in which a basic injection time is multiplied by a factor that depends on the pilot-controlled or measured secondary air mass and on the desired value for the exhaust gas ratio. The basic injection time is read out of a performance graph that is stored in the memory 10 and defines the basic injection time as a function of the engine load and speed (rpm).

Due to the fact that the pilot control of the secondary air mass is sluggish, the actually required secondary air mass per unit of time is determined and passed on to the control unit 6 by an air mass meter 15 that is installed between the secondary air pump 7 and the secondary air valve 9. An air mass meter 15 has the advantage that the ambient temperature and the air density (oxygen content per volume) are automatically taken into account.

Another simple option for determining the secondary air mass required by the secondary air pump is also shown in FIG. 1 and is based on the use of a second pressure sensor 19, which is connected to the connecting duct 8 between the secondary air pump 7 and the air valve 9. The pressure measured in the connecting duct 8 is dependent on the secondary air mass pumped. However, for adequate precision it is necessary to take the temperature of the secondary air mass into account as well. To that end, an intake air temperature sensor 20 is used for approximation, which is disposed in the intake duct 2 of the engine 1 and which measures the temperature of the aspirated air and passes it on to the control unit 6.

A performance graph (characteristic field) is stored in the memory 10 which indicates the pumped secondary air mass as a function of the measured pressure and the measured aspirated air temperature. In this embodiment, the control unit 6 ascertains the secondary air mass from the performance graphs in view of the measured pressure, and calculates therefrom the quantity of fuel to be injected.

A further feature of the invention provides that the secondary air pump 7 pumps secondary air at a constant rpm, and the secondary air mass delivered to the exhaust gas duct 3 is adjusted through the air valve 9. The air valve 9 is thereby a cross-section controlled valve and it is controlled by the control unit 6.

Figure 2:
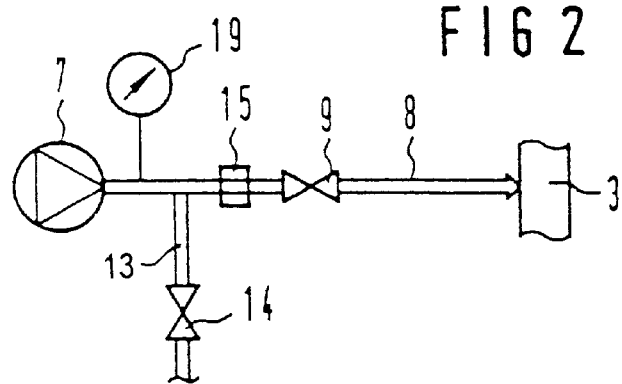
FIG. 2 is a schematic and diagrammatic view of a valve assembly.

A further embodiment of the invention includes regulating the quantity of secondary air through a metering valve 14, as shown in FIG. 2. In this case a branch line 13 is connected between the secondary air pump 7 and the air valve 9, and it connects the outlet of the secondary air pump 7 with the environment through the metering valve 14. In this exemplary embodiment, the air valve 9 is constructed as an on/off valve and thus makes only the two switching positions, open or closed, possible. The metering valve 14 is constructed to be regulatable in its cross section and is controlled by the control unit 6. The secondary air mass that is injected into the exhaust gas duct 3 is defined by the opening cross section of the metering valve 14. If secondary air is to be blown into the exhaust gas duct 3, then the air valve 9 is opened and the metering valve 14 is closed. With a closed metering valve 14, all of the secondary air pumped by the secondary air pump 7 is blown into the exhaust gas duct 3. The farther the metering valve 14 is opened, the less secondary air mass is blown into the exhaust gas duct 3.

FIG. 3 shows a characteristic curve for the desired value of the exhaust gas ratio upstream of the catalytic converter 4 as a function of the catalytic converter temperature T that leads to a rapid warming of the catalytic converter 4.

FIG. 4 shows a characteristic curve for the desired value of the exhaust gas ratio upstream of the catalytic converter 4 as a function of the time elapsed since the start of the engine 1 that leads to a rapid warming of the catalytic converter 4.

FIG. 5 shows a characteristic curve that indicates the mass of secondary air to be injected into the exhaust gas duct 3 as a function of the engine air mass flow.

The effect of the process according to the invention will now be explained in conjunction with the drawings.

In order to achieve especially low exhaust gas values, it is necessary that the catalytic converter be heated up to an operating temperature of approximately 300° C. within the shortest possible time. This is accomplished, among other ways in that the control unit 6 sets a lean exhaust gas mixture with an air number of $\Delta>1$, preferably in the range from 1.0 to 1.3, in the exhaust gas duct 3 between the engine and the catalytic converter 4.

The exhaust gas ratio upstream of the catalytic converter 4 is calculated from the engine air mass that is supplied to the engine 1 and the secondary air mass that is injected into the exhaust gas duct 3 by the secondary air pump 7, referred to the quantity of fuel supplied to the engine 1 by the injection system 5.

In order to adjust the exhaust gas ratio to the respective desired value of the characteristic curve of FIGS. 3 or 4, an injection quantity that is injected into the engine 1 by the injection system 5 is calculated through the use of a fixed base value, which is multiplied by a factor that is calculated as a function of the secondary air mass and of the desired value of the exhaust gas ratio in the exhaust gas duct 3. Weighting of the injection quantity as a function of the secondary air mass is achieved by multiplication with the factor.

In a simple embodiment of the invention, the injection time is predetermined by a basic injection time that leads to a combustion mixture of Δ=1 in the engine 1 when no secondary air is blown in. The basic injection time is multiplied, for the duration of operation of the secondary air pump 7, by a corresponding weighting factor that takes into account the actual secondary air mass and the desired value of the exhaust gas ratio. In this way, accurate adaptation of the injection time to the actual secondary air mass and to the desired value of the exhaust gas ratio is possible.

The injection time and the weighting factor may be calculated according to the following formulae. First, the injection time ti is calculated as follows:

$$ti = (ti_b + c) \ast (1 + fak)$$

wherein $ti_b$ represents the basic injection time, having a value which is 1 ms, for example; c is a correction value for non-steady-state engine operation; and fak is the weighting factor. For the basic injection time $ti_b$, performance graphs are stored in the memory 10 that indicate the basic injection time as a function of the rpm and/or of the engine load.

The weighting factor fak is calculated as follows:

$$fak = \frac{lmb + lms}{lvk \cdot lmb} - 1$$

wherein 1 mb is the engine air mass in kg/h, lms is the secondary air mass in kg/h, and 1 vk is the desired value of the exhaust gas ratio upstream of the catalytic converter 4.

The catalytic converter is heated to its operating temperature in the shortest possible time by establishing the desired value of the exhaust gas ratio in accordance with FIG. 3 or FIG. 4. The exhaust gas ratio is defined as a function of the temperature of the catalytic converter, in accordance with FIG. 3, or as a function of the time that has elapsed since the starting of the engine 1, in accordance with FIG. 4.

The temperature of the catalytic converter is either measured with the temperature sensor 18 or ascertained through a substitute temperature calculation. In the substitute temperature calculation, the temperature of the catalytic converter 4 is, for instance, calculated as a function of other engine parameters. Such calculations are known to those skilled in the art.

In a further feature of the invention, to avoid combustion misfiring from overenrichment of the combustion mixture, the maximum allowable injection quantity (enrichment) is limited to a maximum value. This is done by setting a maximum weighting factor $fak_{max}$ and, if the calculated weighting factor fak exceeds the maximum weighting factor $fak_{max}$, then the weighting factor fak is set to the maximum weighting factor $fak = fak_{max}$.

We claim:

1. A process for controlling an exhaust gas ratio of fuel to oxygen in an internal combustion engine exhaust gas upstream of a catalytic converter, comprising:

injecting secondary air into an exhaust gas duct between an internal combustion engine and a catalytic converter with a secondary air pump; and adjusting an amount of fuel supplied to the internal combustion engine in dependence on the secondary air and on a predetermined value for an exhaust gas ratio upstream of the catalytic converter.

2. The process according to claim 1, which comprises regulating the secondary air mass as a function of an exhaust gas pressure in the exhaust gas duct upstream of the catalytic converter.

3. The process according to claim 2, which comprises regulating an amount of secondary air mass supplied to the exhaust gas duct with an air valve having an ON position and an OFF position and with a metering valve blowing off excess secondary air to the environment.

4. The process according to claim 1, which comprises regulating the secondary air mass as a function of an engine air mass delivered to the engine.

5. The process according to claim 1, which comprises defining the predetermined value of the exhaust gas ratio is from 1.0 to 1.3.

6. The process according to claim 1, which comprises defining the predetermined value of the exhaust gas ratio in dependence on the temperature of the catalytic converter.

7. The process according to claim 1, which comprises defining the predetermined value of the exhaust gas ratio in dependence on an operating time of the internal combustion engine measured from a last start of the engine.

8. The process according to claim 1, which comprises calculating a fuel quantity using a basic value multiplied by a weighting factor, wherein the weighting factor is dependent on the secondary air mass and on the predetermined value for the exhaust gas ratio.

9. The process according to claim 8, which comprises defining a maximum weighting factor and limiting the weighting factor to the maximum weighting factor.

10. A process for controlling an exhaust gas ratio of fuel to oxygen in an internal combustion engine exhaust gas upstream of a catalytic converter, comprising:

supplying a given amount of fuel to an internal combustion engine, and determining a desired value for an exhaust gas ratio upstream of the catalytic converter; and injecting secondary air into an exhaust gas duct between the internal combustion engine and a catalytic converter with a secondary air pump, and adjusting an amount of secondary air in dependence on the given amount of fuel supplied to the internal combustion engine and on the desired value for the exhaust gas ratio.

* * * * *